United States Patent [19]

Davis

[11] 4,211,568
[45] Jul. 8, 1980

[54] STORABLE GLASS BATCH COMPOSITION

[75] Inventor: Douglas H. Davis, Canal Fulton, Ohio

[73] Assignee: PPG Industries, Inc., Pittsburgh, Pa.

[21] Appl. No.: 877,538

[22] Filed: Feb. 13, 1978

Related U.S. Application Data

[63] Continuation-in-part of Ser. No. 476,647, Jun. 5, 1974, abandoned.

[51] Int. Cl.² .............................................. C03B 1/00
[52] U.S. Cl. .............................. 106/52; 106/DIG. 8
[58] Field of Search ...................... 106/DIG. 8, 52; 264/117; 65/27, 335; 423/334

[56] References Cited

U.S. PATENT DOCUMENTS

| | | | |
|---|---|---|---|
| 3,149,983 | 9/1964 | Maris et al. | 106/52 |
| 3,234,034 | 2/1966 | Jasinski et al. | 106/52 |
| 3,573,887 | 4/1971 | Mod et al. | 106/DIG. 8 |
| 3,760,051 | 9/1973 | Eirich et al. | 264/117 |
| 3,782,906 | 1/1974 | Pierce | 264/117 |
| 3,914,364 | 10/1975 | Engelleitner et al. | 106/DIG. 8 |

FOREIGN PATENT DOCUMENTS 1952274  6/1970  Fed. Rep. of Germany ............. 106/52

OTHER PUBLICATIONS

Hopkins, R. W. "How to Use Caustic Soda in Glass-"-Ceramic Industry-Nov. 1965, pp. 60–61.

*Primary Examiner*—Helen M. McCarthy
*Attorney, Agent, or Firm*—Edward J. Whitfield

[57] ABSTRACT

A glass batch that retains its free-flowing properties during storage is disclosed wherein at least 50 percent of the $Na_2O$ requirement of the batch is provided by an aqueous sodium hydroxide solution consisting of both solid and solution phases at the temperature at which the batch is stored.

10 Claims, 2 Drawing Figures

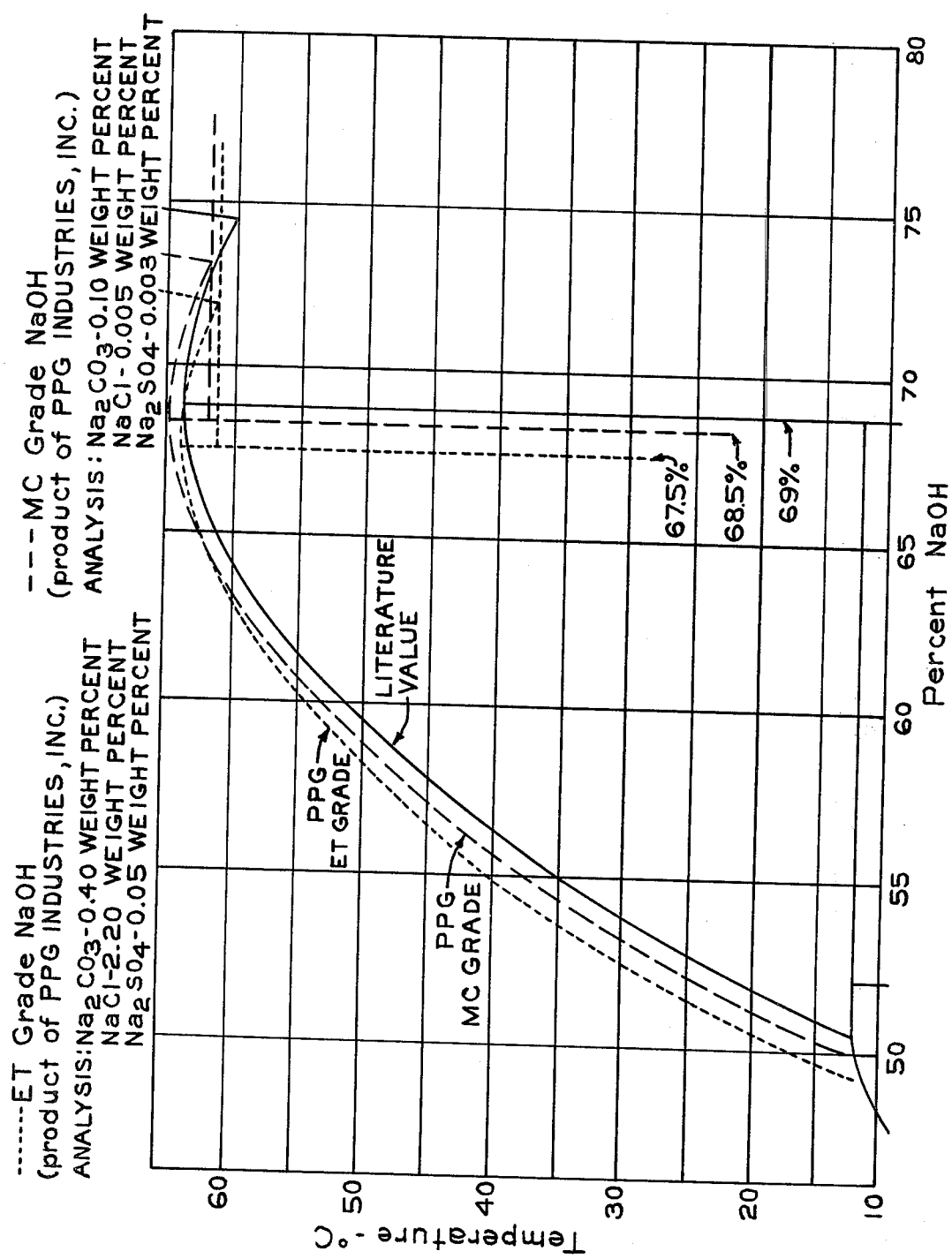

STORABLE GLASS BATCH COMPOSITION

BACKGROUND OF THE INVENTION

This application is a continuation-in-part of application Serial No. 476,647 filed June 5, 1974, now abandoned and relates to a glass batch for use in the production of soda-lime-silica glass.

Glass is typically produced by melting a batch comprising a homogeneous, finely-divided mixture of a silica source material, a sodium oxide ($Na_2O$) source material, and an alkaline earth metal oxide source material. The glass batch is formulated to yield a glass product having a desired composition. For example, typical soda-lime-silica glass has the following composition:

| Constituent | Weight Percent |
| --- | --- |
| $SiO_2$ | 50–75 |
| $Na_2O$ | 10–20 |
| CaO | 5–15 |
| MgO | 0–8 |
| $Al_2O_3$ | 0–10 |
| $K_2O$ | 0 3 |

In addition, other ingredients may be added to the batch to aid in the processing of the glass melt and to impart to or enhance some special property of the glass product, e.g., chemical resistance, color, low thermal expansion coefficient and the like. The batch may also contain some cullet or scrap glass, although cullet is typically charged directly to the glass furnace. Such soda-lime-silica glass batch formulations are well known and described in, for example, the *Handbook of Glass Manufacture* edited by Fay V. Tooley, Ogden Publishing Co., New York, N.Y. (1953), the teachings of which are incorporated by reference herein.

The batch, after formulation, is conveyed to a feed bin or hopper located proximate the glass melting furnace and, depending on demand, could be stored for up to 6 to 8 hours prior to use. Since conventional glass plant materials handling equipment comprises buckets, conveyor belts, gravity feed chutes, hoppers, and the like, the batch, for environmental reasons, must be substantially dust-free and, moreover, must have no pronounced adhesive or cohesive characteristics which would cause difficulties in conveying and feeding the batch using said conventional materials handling apparatus. In addition, the handling characteristics of the batch must not vary substantially from the time of preparation to the time of use.

Sodium carbonate ($Na_2CO_3$) is typically used as the $Na_2O$ source material in a soda-lime-silica glass batch and it is known to moisten such batches with water to reduce dusting and reduce the tendency of the batch constituents to segregate. Aqueous sodium hydroxide solutions have also been used to moisten soda-lime-silica glass batches to reduce dusting and improve homogeneity and handling properties. In addition, it is known to use sodium hydroxide to satisfy all or part of the $Na_2O$ requirement of the batch thus replacing all or part of the $Na_2CO_3$ typically used.

The use fo sodium hydroxide in the preparation of soda-lime-silica glass batches is disclosed, for example, in U.S. Pat. Nos. 3,149,983; 3,234,034; 3,573,887; 3,760,051; 3,782,906; German Patent No. 1,952,274; and the article entitled "How To Use Caustic Soda In Glass" by R. W. Hopkins, Geramic Industry, Nov., 1965, pp. 60–61.

Difficulties, however, attend the use of aqueous sodium hydroxide as a replacement for $Na_2CO_3$ to provide the $Na_2O$ requirement of the glass batch, especially when it is desired to provide at least about 50 percent of the $Na_2O$ requirement of the batch via the use of sodium hydroxide. Commercial grade sodium hydroxide, i.e., either a 50 percent or a 73 percent by weight aqueous solution of NaOH, is preferred for use by the prior art as a replacement for $Na_2CO_3$ in a soda-lime-silica glass batch.

Glass batch after preparation and prior to use is typically stored at a temperature of from 25° C. to 50° C. Since 73 percent NaOH is a solid at temperatures below about 60° C., in a batch prepared with 73 percent NaOH and cooled to storage temperature, the NaOH solidifies to produce a concreted, dry, frangible batch. Although 50 percent NaOH is a liquid at typical batch storage temperatures, if 50 percent NaOH is used to replace $Na_2CO_3$ to provide the $Na_2O$ requirement of the batch, the resultant batch may be too fluid and as such would tend to separate into solid and liquid phases. Neither the solidified nor fluidized batches can conveniently be handled using conventional glass batch handling apparatus and, moreover, the fluidized batch imposes additional energy requirements since the excess water must be vaporized in the glass furnace.

Although special apparatus may be used with fluidized or concreted glass batches wherein a batch is continuously mixed and fed to the furnace without the need for storing the batch, such apparatus does not allow sufficient opportunity to analyze the batch prior to charging to the glass furnace with the consequence that an improperly formulated batch may be inadvertently charged.

SUMMARY OF THE INVENTION

A storable, free-flowing, soda-lime-silica glass batch is provided wherein at least 50 percent of the $Na_2O$ requirement of the batch is provided by aqueous sodium hydroxide having both solid and solution phases at the temperature at which the batch is stored, the solid phase having the composition $NaOH.H_2O$.

DESCRIPTION OF THE DRAWINGS

FIG. 2 is an enlarged view of Region 12 of the phase diagram of FIG. 1 showing the effect of impurities contained in sodium hydroxide solutions prepared from commercial grades of 73 percent aqueous sodium hydroxide.

DESCRIPTION OF THE INVENTION

Figure 1:
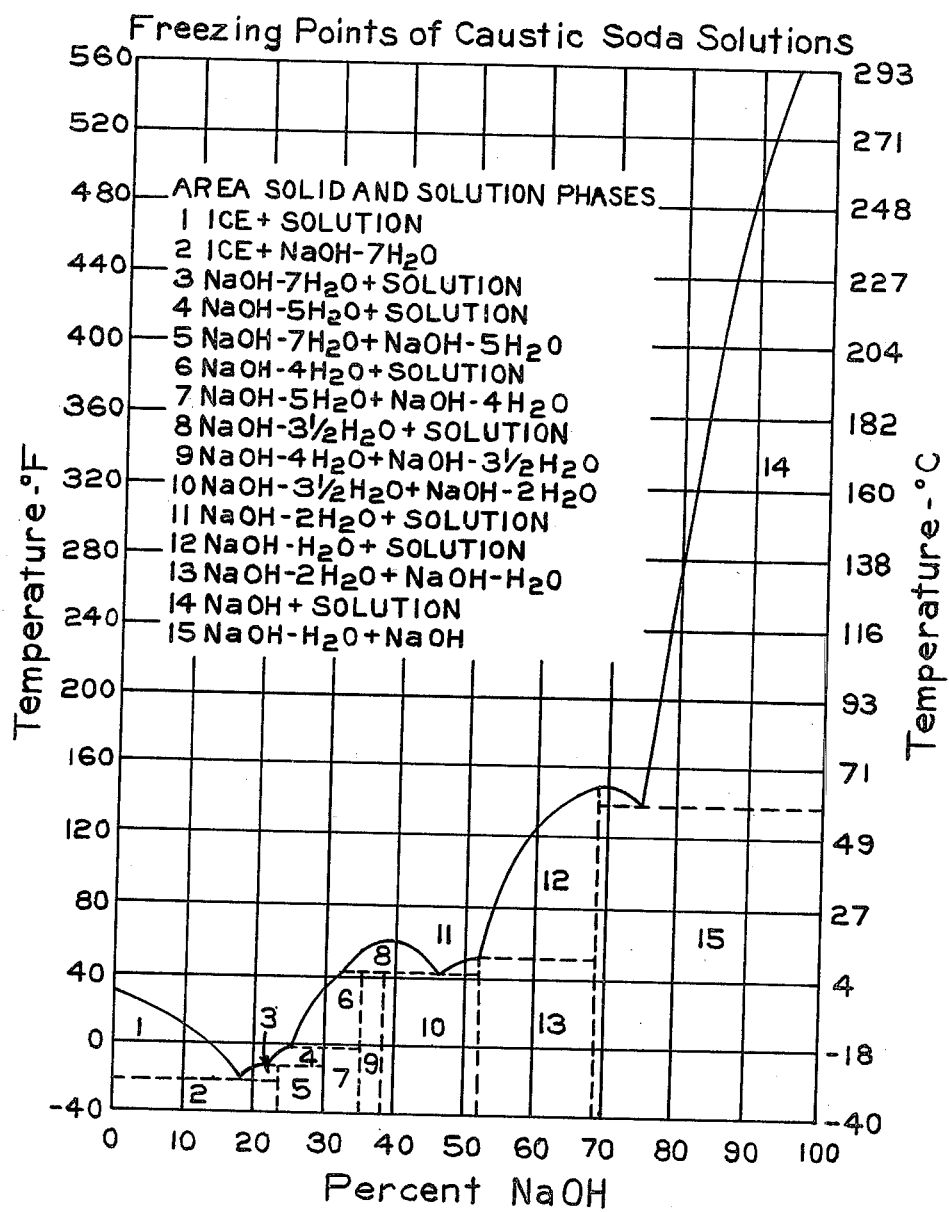
FIG. 1 is a phase diagram representing the solid and solution phase relationships of aqueous sodium hydroxide solutions as a function of temperature.

According to this invention, a soda-lime-silica glass batch is prepared by intimately mixing a silica source material, an alkaline earth metal oxide source material, and a $Na_2O$ source material to provide a homogeneous, free-flowing, storage-stable mixture. The silica source material is typically a suitable sand, the alkaline metal oxide source material is typically limestone, dolomite or a hydroxide, oxide or carbonate of calcium and/or magnesium, and the $Na_2O$ source material is a 53 percent to 70 percent, preferably 62 percent to 68 percent and most preferably 66 to 68 percent, aqueous sodium hydroxide solution, sufficient sodium hydroxide solution being used to provide at least 50 percent and preferably at least 70 percent of the Na₂O requirement of the batch. Particle size of the sand is typically in the range of 30 to 100 mesh and particle size of the limestone or dolomite is typically in the range of 10 to 80 mesh.

With reference to FIG. 1 (which has been constructed from data derived from the International Critical Tables, Volume IV), it has been found that a glass batch having at least 50 percent of its $Na_2O$ requirement provided by a sodium hydroxide solution having the compositional limits defining Region 12 of FIG. 1 and stored at a temperature below the liquidus point of a sodium hydroxide solution within said compositional limits will enable the production of a glass batch that will retain its free-flowing properties over the period of time during which the batch is typically stored prior to charging to the glass-making furnace.

A batch or glass batch as used herein means a glass batch for use in making a soda-lime-silica glass having a $Na_2O$ content of between 10 percent to 20 percent by weight and a free-flowing batch or free-flowing glass batch is one comprising a moist, uniform, homogeneous mixture of silica source material, alkaline earth metal oxide source material, and $Na_2O$ source material that is readily transportable and storeable at a temperature within the temperature range of 12° C. to 65° C. without encountering significant dusting or segregation difficulties and one that is not pelletized (i.e. not agglomerated), briquetted, or slurried.

A glass batch that is free-flowing according to the invention, is one wherein the sodium hydroxide used to provide the $Na_2O$ requirement of the batch will consist of a solid phase and a solution phase at a temperature within the range of 12° C. to 65° C. at which the batch is stored subsequent to preparation and prior to use, the solid phase having the composition $NaOH \cdot H_2O$.

The precise composition and quantity of aqueous sodium hydroxide solution will vary depending on the desired extent of replacement of $Na_2CO_3$ by sodoim hydroxide and the reactivity of the alkaline earth metal oxide source material. For example, sodium hydroxide will react with limestone or dolomite to form alkaline earth metal hydroxides and sodium carbonate, the reaction occurring principally during mixing of the batch and proceeding relatively slowly thereafter. Since the reaction product of te causticaklaline earth reaction is hygroscopic, there must be sufficient moisture in the batch to prevent concretion. On the other hand, too much moisture will result in the opposite extreme of a too fluid batch.

By using sodium hydroxide solutions within the area defined by Region 12 of FIG. 1, the moisture content of a given batch (which is determinative of batch free-flowing properties) may be regulated by selecting a sodium hydroxide concentration which, at a particular storage temperature, will provide the requisite proportion of solution phase to solid $NaOH \cdot H_2O$ in the batch. The proportion of solution phase to solid phase within Region 12 of FIG. 1 may be found by application of the Lever Rule for phase equilibrium. For example, at a particular temperature, a horizontal tie line is constructed connecting the point on the liquidus curve with the point on the vertical line representing the congruent melting composition. The congruent melting composition which constitutes the right-most barrier of Region 12 corresponds to an about 69 percent, more precisely 68.94 percent, sodium hydroxide solution. The length of the tie line extending from the congruent melting point to a selected sodium hydroxide concentration divided by the total length of the tie line gives the weight fraction of solution phase for the selected sodium hydroxide concentration. More specifically, with reference to FIG. 2, assume it is desired to compute the weight fraction of solution phase of a 60 percent sodium hydroxide solution at 40° C. (using literature values for the liquidus and congruently melting composition). At 40° C., the length, t, of the tie line between the liquidus curve and the congruently melting composition measures about 3.19 inches (8.1 centimeters) and the length, s, of that portion of the tie line between the congruently melting composition and the point corresponding to a 60 percent NaOH solution measures about 2.22 inches (5.6 centimeters). Dividing length 's' by length 't' gives a weight fraction of solution phase in a 60 percent sodium hydroxide solution at 40° C. of about 0.69.

FIG. 2 further illustrates the effect of impurities contained in commercial grade 73 percent sodium hydroxide solutions which shift somewhat the perimeters of Region 12 of FIG. 1. In FIG. 2, sodium hydroxide solutions prepared using two commercial grades of aqueous sodium hydroxide are, as shown by the broken lines, seen to have their liquidus curves and congruent melting compositions shifted slightly to the left of the liquidus curve and congruent melting composition obtained using pure sodium hydroxide solutions.

Thus, taking into account impurities typically encoutered in commercial grade sodium hydroxide solutions, aqueous sodium hydroxide solutions contemplated for use in preparing a glass batch according to the invention are those which contain from 53 percent to 70 percent, preferably 62 percent to 68 percent and most preferably from 66 percent to 68 percent, sodium hydroxide and consist of both solid and liquid phases at a temperature within the range of from 12° C. to 65° C., the solid phase having the compostion $NaOH \cdot H_2O$.

Since, depending on the desired composition of the glass product the batch composition will vary over a wide range, it is not possible to specify with any degree of particularity a precise concentration of aqueous sodium hydroxide solution other than a sodium hydroxide solution comtemplated for use in accordance with the invention must have the defined phase relationship $NaOH \cdot H_2O$ (solid) plus solution at the storage temperature of the batch and provide sufficient residual solution phase to give a batch having a free-flowing consistency, i.e., one that is neither too fluid nor too concreted.

In practice, a glass batch, after formulation and stabilization at the storage temperature, is typically tested by various empirical, semiquantiative procedures. For example, the consistency of a batch may be judged simply by squeezing a sample in the hand to determine its suitability. Although this test is largely subjective, an experienced operator can generally determine by feel whether a batch is too moist or too dry.

Another commonly used test is the so-called "slump test" wherein a batch is loosely filled into a 3 × 12 inch diameter tube. The tube is raised so that the contained material flows out into a conical pile with the height of the pile being a relative measure of the batch consistency, i.e., moisture content. A pile height of between 2-½ to 3-½ inches is generally indicative of satisfactory batch consistency whereas a pile height of less than 2-½ inches or greater than 3-½ inches is generally indicative of either a too dry or too moist batch.

On other test is the so-called "cone test" wherein the batch is filled loosely into a series of truncated cones having base diameters of 2, 3, 4, 5 and 6 inches, the height and slope being the same for each cone. The cones are raised and tapped with the fingers and a determination as to batch consistency is made depending on whether the contained material readily drops from the cones or tends to "hang-up" in the cones.

All of these tests are, of course, subjective to a greater or lesser extent, however, a reliable measure of the consistency of a given batch may be had by determining its bulk density, which is measured by loosely filling a tared container of a known volume with glass batch and determining the weight of the batch. The weight of the glass batch divided by the volume occupied results in the bulk density. It has been found that glass batches prepared in accordance with the invention having a bulk density of between 55 and 70 pounds per cubic foot and preferably between 60 and 65 pounds per cubic foot, will usually possess the desirable characteristic of retaining free-flowing properties for the length of time and at the temperatures glass batches are typically stored after preparation and prior to charging to the glass melting furnace. Glass batches having bulk densities below about 55 pounds per cubic foot and in excess of about 70 pounds per cubic foot have been found to be generally unsatisfactory since such batches are respectively too fluid and too concreted.

In a typical practice of the invention, the dry constituents of the glass batch, i.e., silica sand, limestone and/or dolomite, and other commonly used glass-making raw materials are first intimately mixed using suitable conventional blending means. The aqueous sodium hydroxide solution is heated to a temperatutre above its liquidus point, i.e., the sodium hydroxide solution consists solely of liquid phase, and is added with continuous stirring to the dry materials. Care should be taken that process conditions are controlled to avoid appreciable vaporization of water and to prevent contact of the aqueous sodium hydroxide with acidic gases, for example, carbon dioxide.

The homogeneous batch mixture is then permitted to cool to the temperature at which it is to be stored, i.e., to a temperature below the liquidus point of the sodium hydroxide solution such that aqueous sodium hydroxide in the batch will consist of both a solution phase and a solid phase, the latter having the composition $NaOH \cdot H_3O$. The batch may then be stored until required for use in the glass-making furnace.

EXAMPLES

The invention is further illustrated but is not intended to be limited by the following examples.

EXAMPLE 1

A glass batch having a $Na_2O$ requirement of 11.5 percent, 50 percent of which $Na_2O$ requirement being provided by sodium carbonate (soda ash) and 50 percent of which $Na_2O$ requirement being provided by a 66 percent by weight sodium hydroxide solution, was prepared as follows:

A dry, homogeneous mixture was prepared consisting of 2416 grams sand, 573 grams dolomite, 196 grams limestone, 85 grams salt cake, and 365 grams soda ash. 256 milliliters of 66 percent by weight aqueous sodium hydroxide solution heated at a temperature of 90° C. was added to the dry mixture and thoroughly blended for about 10 minutes. The glass batch thus prepared had a bulk density of 61.8 pounds per cubic foot and had satisfactory free-flowing properties as measured by the squeeze, slump and cone tests. After storage for one hour at 55° C., the bulk density was 62.3 pounds per cubic foot and the batch retained its satisfactory free-flowing properties as measured by the said squeeze, slump and cone tests.

EXAMPLE 2

The procedure described in Example 1 was followed, except that 292 grams of soda ash and 307 milliliters of 66 percent sodium hydroxide solution were used in the batch preparation, 40 percent of the $Na_2O$ requirement of the batch being provided by soda ash and 60 percent of the $Na_2O$ requirement of the batch provided by sodium hydroxide. The glass batch thus prepared had a bulk density of 59.4 pounds per cubic foot and had satisfactory free-flowing properties as measured by the squeeze, slump, and cone tests. After storage for one hour at 55° C., the bulk density was 60.5 pounds per cubic foot and the batch retained its satisfactory free-flowing properties as measured by said tests.

EXAMPLE 3

The procedure described in Example 1 was followed except that 245 milliliters of 68 percent aqueous sodium hydroxide solution was used in the batch preparation, 50 percent of the $Na_2O$ requirement of the batch being provided by soda ash and 50 percent of the $Na_2O$ requirement of the batch being provided by sodium hydroxide. The glass batch thus prepared had a bulk density of 67.3 pounds per cubic foot and had satisfactory free-flowing properties as measured by the squeeze, slump and cone tests. After storage for one hour at 55° C., the bulk density was 69.3 pounds per cubic foot and the batch retained its satisfactory free-flowing properties as measured by said tests.

EXAMPLE 4

The procedure described in Example 1 was followed except that 292 grams of soda ash and 294 milliliters of 68 percent aqueous sodium hydroxide solution were used in the batch preparrion, 40 percent of the $Na_2O$ requirement of the batch being provided by soda ash and 60 percent of the $Na_2O$ requirement being provided by sodium hydroxide. The batch thus prepared had a bulk density of 63.1 pounds per cubic foot and had satisfactory free-flowing properties as measured by the squeeze, slump and cone tests. After storage for one hour at 55° C., the bulk density was 63.9 pounds per cubic foot and the batch retained its satisfactory free-flowing properties as measured by said tests.

EXAMPLE 5

The procedure described in Example 1 was followed except that 219 grams of soda ash and 343 milliliters of 68 percent aqueous sodium hydroxide solution were used in the batch preparation, 30 percent of the $Na_2O$ requirement of the batch being provided by soda ash and 70 percent of the $Na_2O$ requirement of the batch being provided by sodium hydroxide. The batch thus prepared had a bulk density of 57.9 pounds per cubic foot and had satisfactory free-flowing properties as measured by the squeeze, slump and cone tests. After storage for one hour at 55° C., the bulk density of the batch was 59.1 pounds per cubic foot and the batch retained its satisfactory free-flowing properties as measured by said tests.

Although the invention has been described with specific references to and specific details of embodiments thereof, it is to be understood that it is not intended to be so limited since changes and alterations therein may be made which are within the full intended scope of this invention as defined by the appended claims.

I claim:

1. A glass batch that is storable and free-flowing at a temperature within the temperature range of 12° C. to 65° C. for use in making soda-lime-silica glass having a Na$_2$O content of from 10 percent to 20 percent by weight, said batch comprising a moist, uniform, unpelletized, homogeneous mixture of silica source material, alkaline earth metal oxide source material and Na$_2$O source material wherein an aqueous sodium hydroxide solution is used as a Na$_2$O source material to provide at least 50 percent of the Na$_2$O requirement of the batch, said aqueous sodium hydroxide containing a percent by weight of NaOH as in FIG. 1, Region 12 and consisting of a solid phase having the composition NaOH.H$_2$O and a solution phase at the temperature within said range at which the batch is stored, said batch having a bulk density of from 55 to 70 pounds per cubic foot.

2. The glass batch of claim 1 wherein at least 70 percent of the Na$_2$O requirement of the batch is provided by said aqueous sodium hydroxide solution.

3. The glass batch of claim 1 wherein the aqueous sodium hydroxide solution contains from 62 to 68 percent NaOH.

4. The glass batch of claim 3 wherein the aqueous sodium hydroxide solution contains between 66 and 68 percent NaOH.

5. The glass batch of claim 1 having a bulk density of from 60 to 65 pounds per cubic foot.

6. In a process for preparing a storable, free-flowing glass batch for use in making soda-lime-silica glass having a Na$_2$O content of from 10 percent to 20 percent by weight comprising uniformaly mixing a silica source material, an alkaline earth metal oxide source material, and a Na$_2$O source material wherein sodium hydroxide is used as a Na$_2$O source material, the improvement comprising using an aqueous sodium hydroxide solution containing a percent by weight of NaOH as in FIG. 1, Region 12 and consisting of a solid phase having the composition NaOH.H$_2$O and a solution phase at a temperature within the range of 12° C. to 65° C., and mixing sufficient of said sodium hydroxide solution with the other constituents of the batch, said aqueous sodium hydroxide being at a temperature above its liquidus point during mixing, to provide a batch having a bulk density of from 55 to 70 pounds per cubic foot and having at least 50 percent of its Na$_2$O requirement provided by sodium hydroxide and maintaining the moist, uniform, unpelletized, homogeneous batch at a storage temperature below the liquidus point of the sodium hydroxide solution whereat the aqueous sodium hydroxide in the batch will consist of said solid and solution phases.

7. The improvement of claim 6 wherein at least 70 percent of the Na$_2$O requirement of the batch is provided by said aqueous sodium hydroxide solution.

8. The improvement of claim 6 wherein the aqueous sodium hydroxide solution contains from 62 to 68 percent NaOH.

9. The improvement of claim 8 wherein the aqueous sodium hydroxide solution contains from 66 to 68 percent NaOH.

10. The improvement of claim 6 wherein the glass batch has a bulk density of from 60 to 65 pounds per cubic foot.